(12) United States Patent
Brubaker et al.

(10) Patent No.: US 12,247,648 B2
(45) Date of Patent: Mar. 11, 2025

(54) STOP PIN FOR A BALL SCREW ASSEMBLY

(71) Applicant: JTEKT Bearings North America LLC, Greenville, SC (US)

(72) Inventors: Justin K. Brubaker, Greenville, SC (US); Ken Anderson, Taylors, SC (US); Trent L. Carpenter, Anderson, SC (US); Daniel J. Schertz, Pickens, SC (US)

(73) Assignee: JTEKT Bearings North America LLC, Greenville, SC (US)

( * ) Notice: Subject to any disclaimer, the term of this patent is extended or adjusted under 35 U.S.C. 154(b) by 53 days.

(21) Appl. No.: 17/796,825

(22) PCT Filed: Feb. 4, 2021

(86) PCT No.: PCT/US2021/016610
§ 371 (c)(1),
(2) Date: Aug. 1, 2022

(87) PCT Pub. No.: WO2021/158788
PCT Pub. Date: Aug. 12, 2021

(65) Prior Publication Data
US 2023/0049077 A1 Feb. 16, 2023

Related U.S. Application Data (60) Provisional application No. 62/969,874, filed on Feb. 4, 2020.

(51) Int. Cl.
F16H 25/22 (2006.01)
(52) U.S. Cl.
CPC .............................. *F16H 25/2233* (2013.01)

(58) Field of Classification Search
CPC ............. F16H 25/2233; F16H 25/2228; F16H 25/2204; F16H 25/2214
See application file for complete search history.

(56) References Cited

U.S. PATENT DOCUMENTS 2,737,843 A * 3/1956 Koehl .................. F16B 19/004
59/8
8,616,348 B2 12/2013 Winkler et al.
(Continued)

FOREIGN PATENT DOCUMENTS

DE 7640810 U1 7/1977
DE 102013202099 A1 * 6/2014 ............. F16D 65/18
(Continued)

OTHER PUBLICATIONS

International Search Report for International Application No. PCT/US2021/016610 mailed Apr. 29, 2021.

*Primary Examiner* — Zakaria Elahmadi
(74) *Attorney, Agent, or Firm* — Nelson Mullins Riley & Scarborough LLP (57) ABSTRACT

A ball screw having a threaded stem including a ball groove formed in an outer surface thereof, a ball nut including a central bore formed by an inner surface thereof, the inner surface defining a ball groove, a first recess extending inwardly from an end face of the ball nut and into the ball groove of the inner surface, and a stop pin disposed in the first recess so that a first end of the stop pin extends inwardly into the ball groove of the inner surface of the ball nut, wherein the stop pin is formed by a coiled strip of metal.

11 Claims, 5 Drawing Sheets

(56) References Cited

U.S. PATENT DOCUMENTS

| | | |
|---|---|---|
| 8,875,851 B2 | 11/2014 | Winkler |
| 9,593,752 B2 | 3/2017 | Adler et al. |
| 9,863,514 B2 | 1/2018 | Tashiro |
| 10,337,575 B2 | 7/2019 | Lee et al. |
| 2009/0283371 A1 | 11/2009 | Winkler et al. |
| 2015/0033891 A1 | 2/2015 | Sakaguchi et al. |
| 2015/0122065 A1 | 5/2015 | Oka et al. |
| 2015/0330487 A1 | 11/2015 | Wilhelm et al. |
| 2016/0033019 A1 | 2/2016 | Aramoto et al. |
| 2016/0186825 A1 | 6/2016 | Winkler et al. |
| 2018/0283510 A1 | 10/2018 | Tashiro |
| 2020/0109771 A1* | 4/2020 | Tashiro .............. F16H 25/2238 |

FOREIGN PATENT DOCUMENTS

| | | |
|---|---|---|
| DE | 102017128522 A1 | 12/2018 |
| FR | 2094877 A5 | 2/1972 |
| GB | 1302836 A | 1/1973 |
| GB | 2406153 A | 3/2005 |
| JP | 2015010708 A | 1/2015 |
| WO | 2021/158788 A1 | 8/2021 |

\* cited by examiner

STOP PIN FOR A BALL SCREW ASSEMBLY

CLAIM OF PRIORITY

This application claims priority to U.S. provisional patent application No. 62/969,874 filed Feb. 4, 2020, the disclosure of which is incorporated by reference herein.

FIELD OF THE INVENTION

The present invention relates generally to ball screws and, more particularly, to end stops for the fore and after springs in a non-recirculating ball screw assembly.

BACKGROUND OF THE INVENTION

Known ball screw assemblies often include a ball train interposed between a ball track formed in an outer surface of a ball screw shaft and a ball track formed in an inner surface of a ball nut. Typically, a coil spring is interposed between a ball at an end of the ball train and a stop formed on the ball nut. In such a non-circulating ball screw assembly, the coil spring does not contract when the ball screw shaft is rotationally driven with a low axial load imposed on the ball screw shaft. Thus, the balls in the ball train do not move relative to the ball nut. Therefore, the ball screw moves with the balls in the ball train sliding on the ball screw shaft.

However, when the ball screw is rotationally driven with a high axial load imposed on the ball screw shaft, the coil spring contracts to allow the ball screw to move with the balls rolling with respect to both the ball nut and the ball screw shaft. Thus, efficient screw power transmission is achieved.

The end stop for the fore and aft springs in a non-recirculating ball screw is typically formed by a ball, a machined wall in the ball nut, a fitted insert, a radial feature or tangential feature. Existing designs often rely on costly machining and some designs may increase torque during operation by causing drag between the stop ball and screw.

The present invention recognizes and addresses considerations of prior art constructions and methods.

SUMMARY OF THE INVENTION

One embodiment of the present disclosure provides a ball screw having a threaded stem including a ball groove formed in an outer surface thereof, a ball nut including a central bore formed by an inner surface thereof, the inner surface defining a ball groove, a first recess extending inwardly from an end face of the ball nut and into the ball groove of the inner surface, and a stop pin disposed in the first recess so that a first end of the stop pin extends inwardly into the ball groove of the inner surface of the ball nut, wherein the stop pin is formed by a coiled strip of metal.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
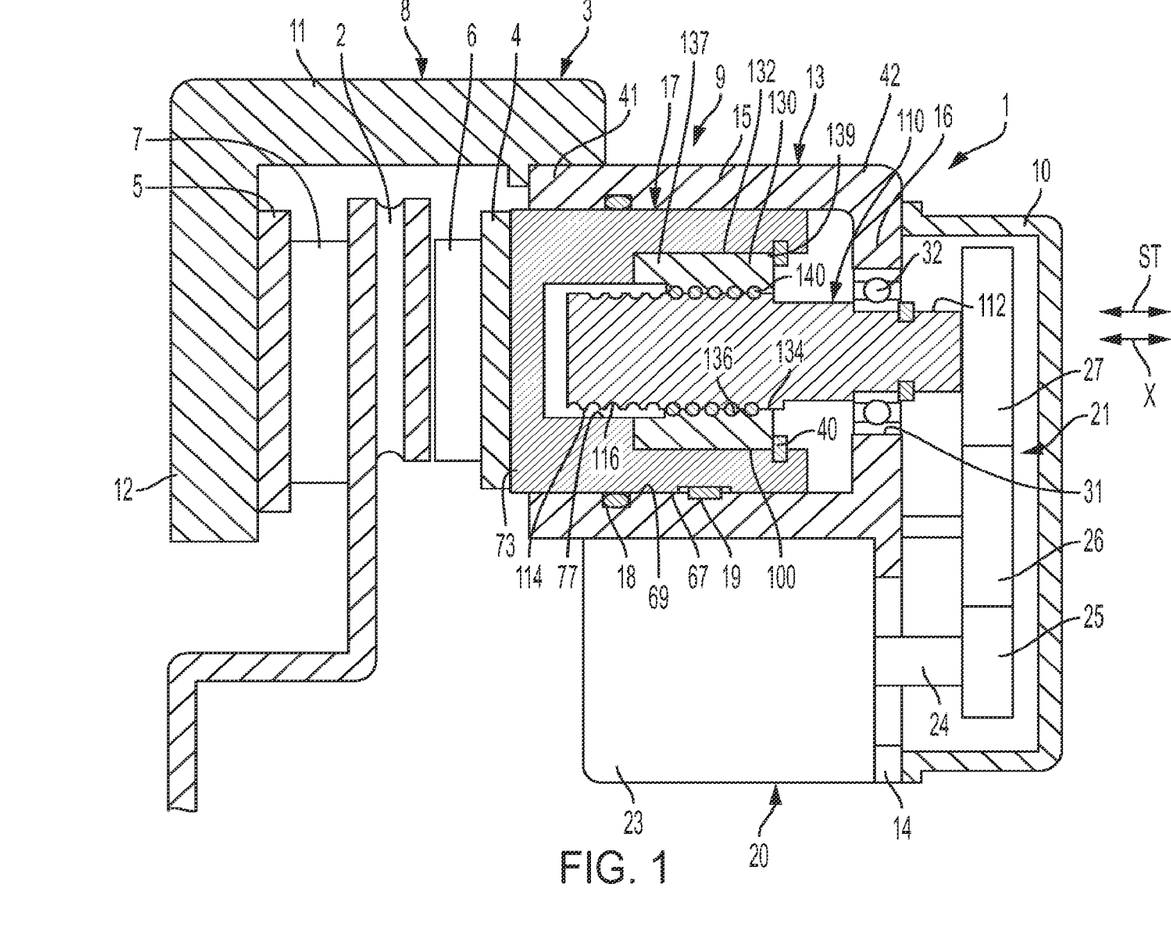
FIG. 1 is a schematic view of a brake assembly including an embodiment of a ball screw assembly including a stop pin in accordance with an embodiment of the present disclosure.

Referring now to the drawings, FIG. 1 is a schematic sectional view of a brake assembly 1 including a ball screw assembly 100 in accordance with a first embodiment of the present disclosure. As shown, the brake assembly 1 selectively applies a frictional braking force to a disc 2 rotating integrally with a wheel of an automobile or the like. The brake apparatus 1 includes a caliper 3, a first backup plate 4 and a second backup plate 5, and a first pad 6 and a second pad 7. The caliper 3 is movably supported by a knuckle (not shown), and the first backup plate 4 and the second backup plate 5 are disposed on the caliper 3 so as to sandwich the brake disc 2 therebetween. The first pad 6 and the second pad 7 are fixed to the first backup plate 4 and the second backup plate 5, respectively, and can press respective side surfaces of the disc 2.

The caliper 3 includes a first body 8, a second body 9, and a cover 10. The first body 8 and the second body 9 are fixed together. The cover 10 is fixed to the second body 9. The first body 8 includes a body portion 11 and an arm portion 12. One end of the second body 9 is fixed to the body portion 11. The arm portion 12 is coupled orthogonally to the body portion 11. The second backup plate 5 is fixed to the arm portion 12. The second body 9 includes a brake cylinder 13 and an extension plate 14. The cylinder 13 is fixed to the body portion 11 of the first body 8. The extension plate 14 extends from the cylinder 13.

The cylinder 13 has a first end 41 and a second end 42 that are opposite to each other in an axial direction. The cylinder 13 includes a cylindrical portion 15 that is open at the first end 41 and an end surface plate 16 coupled to the second end 42 of the cylindrical portion 15. A piston 17 that is movable in the axial direction ST is housed in the cylinder 13. An end 73 of the piston 17 protrudes toward the disc 2 through an opening portion at an end of the cylinder 13 (that corresponds to the first end 41 of the cylindrical portion 15) and is fixed to the first backup plate 4.

A seal member 18 is interposed between a cylindrical outer surface 67 of the piston 17 and an inner surface of the cylinder 13 (that corresponds to an inner surface 69 of the cylindrical portion 15) to seal the gap between the outer surface 67 and the inner surface 69. The seal member 18 may be an O-ring housed in a housing groove formed in the inner surface 69 of the cylinder 13. The outer surface 67 of the piston 17 and the inner surface 69 of the cylinder 13 are coupled together via a key 19 provided in keyways formed in the outer surface 67 and the inner surface 69. Key coupling using the key 19 allows movement of the piston 17 in the axial direction ST to be guided and also allows rotation of the piston 17 with respect to the cylinder 13 to be regulated.

Hydraulic pressure that biases the piston 17 toward the disc 2 may be supplied into the cylinder 13 through a hydraulic path not depicted in the drawings. In that case, the cylinder 13 and the piston 17 form a hydraulic actuator. The caliper 3 functions to press both of the pads 6 and 7 against the disc 2 to generate a braking force. The caliper 3 includes an electric motor 20, a speed reduction apparatus 21, and the ball screw assembly 100. The speed reduction apparatus 21 reduces the rotation speed of the electric motor 20. The ball screw apparatus 100 converts rotary motion transmitted from the electric motor 20 via the speed reduction apparatus 21 into linear motion of the piston 17 in the axial direction ST.

The electric motor 20 includes a motor housing 23 and an output shaft 24. The motor housing 23 is fixed to the extension plate 14 of the second body 9. The speed reduction apparatus 21 includes a driving gear 25, an idle gear 26, and a driven gear 27. The driving gear 25 is attached to one end of the output shaft 24 of the electric motor 20 so as to rotate together with the output shaft 24. The idle gear 26 meshes with the driving gear 25. The driven gear 27 meshes with the idle gear 26. The idle gear 26 is pivotally supported by the second body 9 so as to be rotatable. The cover 10 is fixed to the second body 9 so as to cover the speed reduction apparatus 21.

The ball screw assembly 100 includes a ball screw shaft 110 and a ball nut 130. The ball screw shaft 110 is an input member. The ball nut 130 is a rotatable output member screwed on the ball screw shaft 110 via a plurality of main balls 140. The ball screw shaft 110 is inserted through the ball nut 130. The ball screw shaft 110 is supported by the second body 9 so as to be immovable in the axial direction but to be rotatable. The ball nut 130 is supported by the second body 9 so as to be movable in the axial direction and to be non-rotatable.

Specifically, the ball screw shaft 110 is supported by a rolling bearing 32 held in a support hole 31 formed in the end surface plate 16 of the cylinder 13 such that the ball screw shaft 110 is rotatable and immovable in the axial direction (axial direction ST). The driven gear 27 is coupled to an end 112 of the ball screw shaft 110 so as to rotate together with the ball screw shaft 110. As shown, the ball nut 130 has a cylindrical outer surface 132 and an inner surface 134. A ball track 136 is formed in the inner surface 134. The ball screw shaft 110 has a cylindrical outer surface 114 in which a ball track 116 is formed. The main balls 140 forming a train are disposed in a ball raceway 150 (FIG. 2) defined between ball track 116 and ball track 136.

The outer surface 132 of the ball nut 130 also includes a rotation regulation portion (not shown). The rotation regulation portion is engaged with a rotation regulation portion (not shown) of an inner surface 77 of the piston 17. The outer surface 132 of the ball nut 130 is fitted within a cylindrical inner surface portion of the piston 17. The engagement between the rotation regulation portions regulates rotation of the piston 17 and the ball nut 130 with respect to each other. The ball nut 130 includes a first end 137 closer to the disc 2 and a second end 139 that is on the opposite side from the first end 137, in a ball nut axial direction X. A retaining ring (annular member) 40 fitted in an annular groove formed in the inner surface 77 of the piston 17 is engaged with an end surface of the second end 139 of the ball nut 130. Thus, the piston 17 and the ball nut 130 are coupled together so as to move together in the axial direction ST (ball nut axial direction X).

When rotation of the output shaft 24 of the electric motor 20 is transmitted to the ball screw shaft 110 via the speed reduction apparatus 21 to rotate the ball screw shaft 110, the ball nut 130 moves in the ball nut axial direction X (axial direction ST). At this time, the piston 17 is guided by the key 19 and moves together with the ball nut 130 in the axial direction ST.

Figure 2:
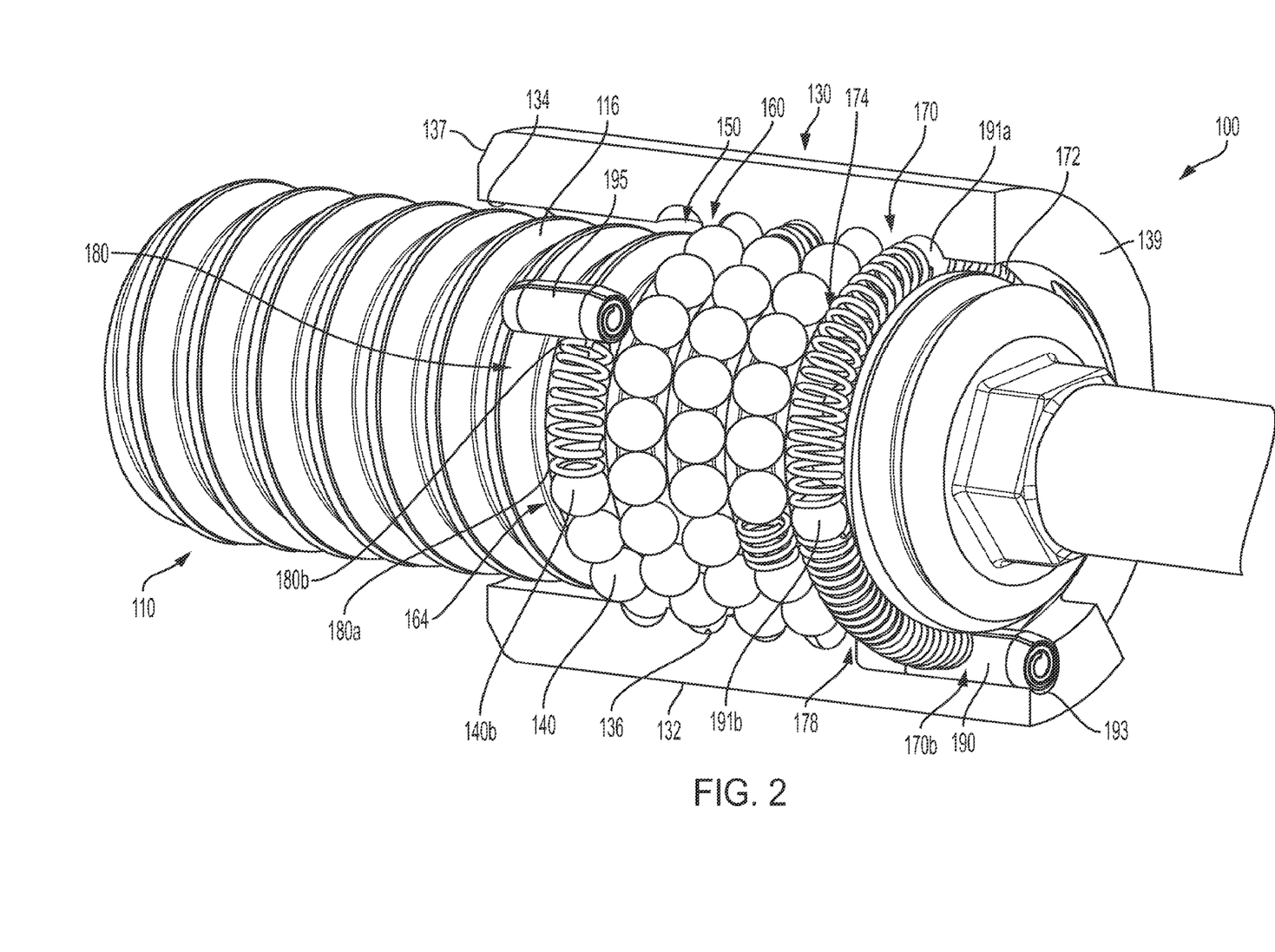
FIG. 2 is a perspective, partial cross-sectional view of the ball screw assembly and stop pin shown in FIG. 1.

As best seen in FIG. 2, the main balls 140 held in the ball raceway 150 form a ball train 160. The ball train 160 includes a first end 162 (FIG. 3) and a second end 164. As shown, one or more link springs 197 may be disposed between adjacent main balls 140 of the ball train 160. The ball screw apparatus 100 includes a main coil spring assembly 170 and a return coil spring 180 disposed on the respective opposite sides of the ball train 160 in the raceway 150.

Figure 3:
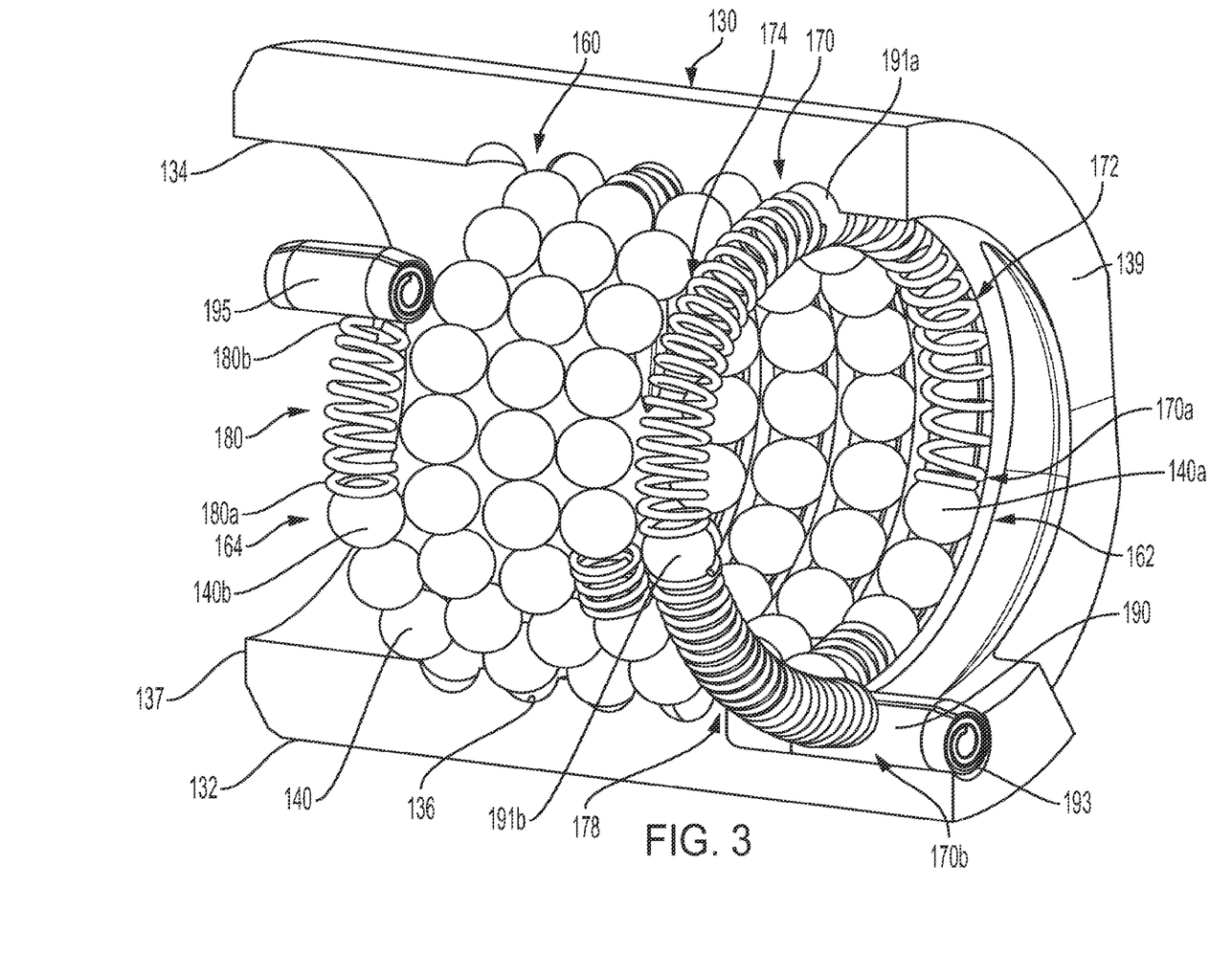
FIG. 3 is a perspective, cross-sectional view of the ball nut of the ball screw assembly shown in FIG. 1, including the stop pin, the ball train, and spring assembly.

As best seen in FIGS. 2 and 3, the main coil spring assembly 170 includes a first end 170a and a second end 170b. The first end 170a engages with a main ball 140a at a first end 162 of the ball train 160. The second end 170b of the main spring assembly 170 engages with a stopper pin 190 that is received in a recess 193 formed in ball nut 130 so that stopper pin 190 extends into ball raceway 150. A return coil spring 180 includes a first end 180a and a second end 180b. The first end 180a engages with a main ball 140b at the second end 164 of the ball train 160. The second end 180b of the return spring 180 engages with a stopper pin 195 that is received in a recess (not shown) that is formed in the ball nut 130 so that stopper pin 195 extends into ball raceway 150.

Figure 4:
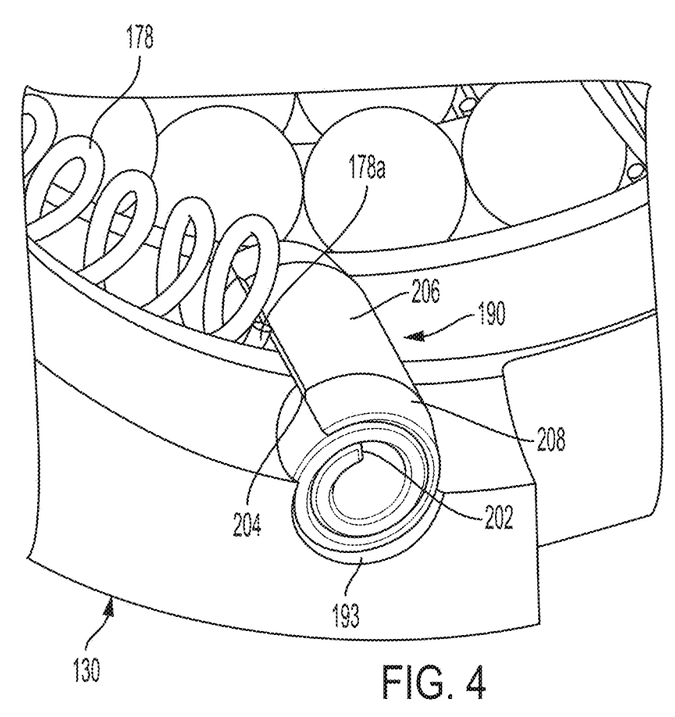
FIG. 4 is a partial perspective view of the ball nut including the stop pin shown in FIG. 3.
Figure 5:
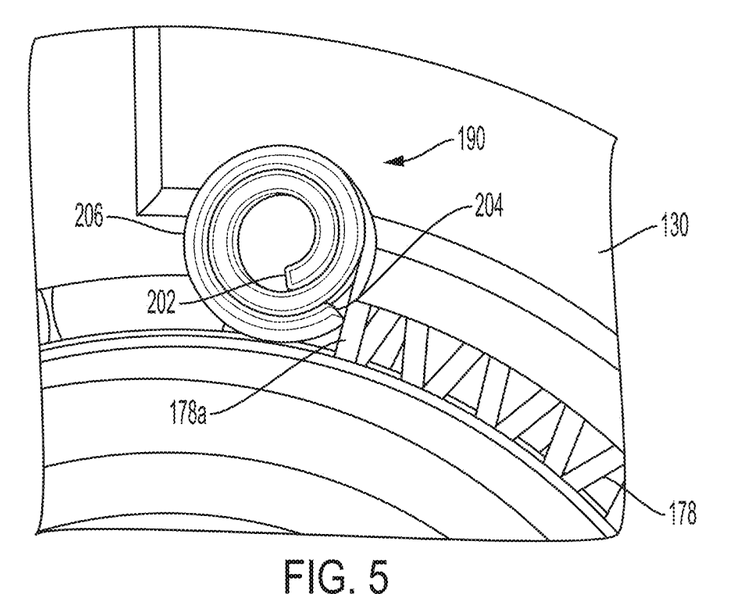
FIG. 5 is a side plan view of the ball nut and stop pin shown in FIG. 3.

As best seen in FIGS. 4 and 5, stop pin 190 is formed as a coiled spring that is pressed into the axial recess 193 of the ball nut 130 to create a rotational stop for the third spring portion 178 of the main spring assembly 170. Stop pin 190 is formed by a strip of metal having an inner end 202 and an outer end 204, a cylindrical outer surface 206 extending therebetween, and a pair of chamfered edges 208 running along each edge of the strip. The chamfered edges 208 facilitate insertion of stop pin 190 into the corresponding axial recess 193. The stop pin 190 may be inserted into axial recess 193 with the outer edge 204 randomly positioned about the circumference of the recess. However, preferably, the stop pin 190 is disposed within the axial recess 193 so that an end coil 178a of the third spring portion 178 makes contact with both the outer end 204 and the other outer cylindrical surface 206 of the stop pin 190 at two points each, for a total of four contact points. The increased number of contact points prevents tilting of the end coil 178*a* with respect to the stop pin 190, thereby facilitating compression of the third spring portion 178 when under load. Additionally, orienting the stop pin 190 in this fashion allows the centerline of the stop pin 190 to be positioned radially outwards, further into the body of the ball nut 130, thereby increasing the material available for retention of stop pin 190 in the ball nut 130. Removing the use of the shaft thread OD (major diameter) from use as 190 spring stop guidance opens up the ability to optimize the ball screw thread rolling process as well as the contact with the corresponding spring. Note, preferably, stop pin 195 is constructed similarly to stop pin 190, although the two constructions may differ.

Figure 6:
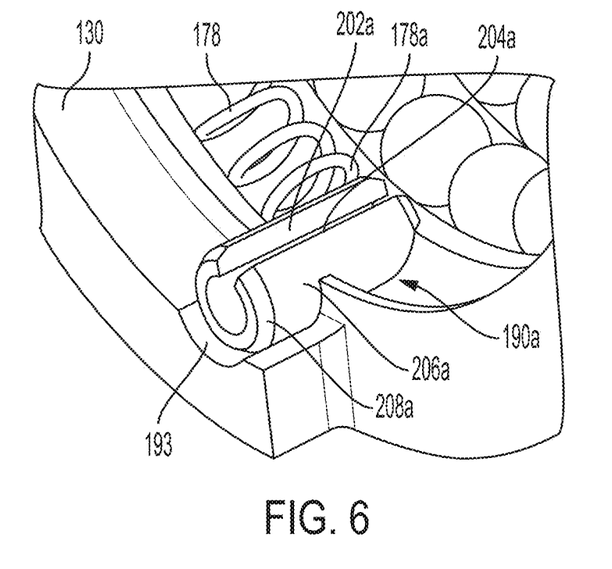
FIG. 6 is a partial perspective view of a ball nut including an alternate embodiment of a stop pin formed in accordance with the present invention.
Figure 7:
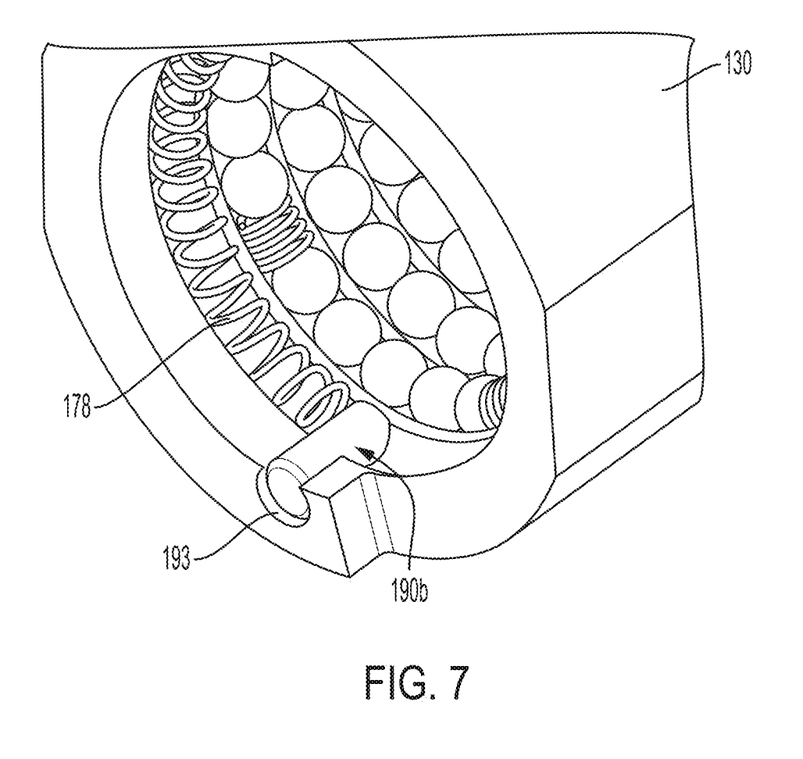
FIG. 7 is a perspective view of a ball nut including an alternate embodiment of a stop pin formed in accordance with the present invention.

As shown in FIG. 6, an alternate embodiment of a stop pin 190*a* is formed as a split pin that is pressed into the axial recess 193 of the ball nut 130 to create a rotational stop for the third spring portion 178 of the main spring assembly 170. Stop pin 190*a* is formed by a strip of metal having a first end 202*a* and a second end 204*a*, a cylindrical outer surface 206*a* extending therebetween and a pair of chamfered edges 208*a* running along each edge of the strip. The chamfered edges 208*a* facilitate insertion of stop pin 190*a* into the corresponding axial recess 193. As shown, the first end 202*a* and the second end 204*a* are substantially parallel and form a gap therebetween. The stop pin 190*a* may be inserted into axial recess 193 with the first and second ends 202*a* and 204*a* randomly positioned about the circumference of the recess. However, preferably, the stop pin 190*a* is disposed within the axial recess 193 so that an end coil 178*a* of the third spring portion 178 makes contact with both the first end 202*a* and the second end 204*a* of the stop pin 190*a* at two points each, for a total of four contact points. The increased number of contact points prevents tilting of the end coil 178*a* with respect to the stop pin 190*a*, thereby facilitating compression of the third spring portion 178 when under load. Note, preferably, stop pin 195 is constructed similarly to stop pin 190, although the two constructions may differ. As shown in FIG. 7, stop pin 190*b* may also be formed by a solid cylindrically shaped pin.

Referring again to FIGS. 2 and 3, the main spring assembly 170 is preferably formed by a plurality of coil spring portions. As shown, main spring assembly 170 includes a first spring portion 172, a second spring portion 174, and a third spring portion 178. The first spring portion 172 is disposed adjacent the first end 162 of the ball train 160 and is separated from the second spring portion 174 by a first link ball 191*a*. The third spring portion 178 is disposed adjacent the stopper pin 190 and is separated from the second spring portion by a second link ball 191*b*. Link balls 191*a* and 191*b* facilitate the motion of spring portions 172, 174, and 178 within the raceway while reducing distortion. To facilitate coil compression across the length of the main spring assembly 170, the spring portions 172, 174, and 178 may be selected so that a first spring constant of first spring portion 172 is greater than the second spring constant of the second spring portion 174, and the second spring constant is greater than the third spring constant of the third spring portion 178. As well, to help reduce friction between the first, second, and third coil spring portions 172, 174, and 178 and the ball nut 130, the circumferential lengths of the spring portions 172, 174, and 178 about the screw shaft 110 circumference are preferably limited to 90° or less when the ball screw assembly 100 is in an unloaded, neutral state.

In operation, when the ball screw shaft 110 is rotationally driven with a low axial load imposed on the ball screw shaft 110, the first, second, and third spring portions 172, 174, and 178 of the main spring assembly 170 do not contract. Thus, the main balls 140 of the ball train 160 do not move relative to the ball nut 130. Therefore, the ball nut 130 moves with the main balls 140 of the ball train 160 sliding on the ball track 116. On the other hand, when the ball screw shaft 110 is rotationally driven with a high axial load imposed on the ball screw shaft 110, the first, second, and third spring portions 172, 174, and 178 of the main spring assembly 170 contract as their coils are compressed. Thus, the ball nut 130 moves with the main balls 140 of the ball train 160 rolling with respect to both the ball nut 130 and the ball screw shaft 110. Consequently, efficient screw power transmission is achieved. Note, unlike known ball screw assemblies in which the coils of the main spring on the load end are compressed whereas the coils on the stopper end are not, compression occurs in the coils of each of the first, second, and third spring portions 172, 174, and 178 in the present disclosure. As noted above, this is accomplished by varying the spring constants dependent upon the position of each spring portion within the load path. By increasing the spring constant of the first spring portion 172 on the load side (the ball train 160 side) and decreasing the spring constant of the third spring portion 178 as the stopper side, the fatigue across all springs can be equalized or balanced. Note, when more than two individual spring portions are used to form the main spring assembly, the spring constant of each subsequent spring portion from the load end will be less than the spring constant of the spring portion that precedes it. For example, in the present example, the spring constant of the first spring portion 172 is greater than the spring constant of the second spring portion 174, which is greater than the spring constant of the third spring portion 178. Note, in an alternate embodiment, a similar result may be achieved by using a single progressive rate main spring.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A ball screw assembly comprising:
   a ball screw shaft including a ball groove formed in an outer surface thereof;
   a ball nut having an outer surface and an inner surface between first and second end faces, the ball nut including a central bore formed by the inner surface thereof, the inner surface defining a ball groove, and an axial recess extending inwardly in a direction parallel to an axis of the central bore of the ball screw nut from one of the first and second end faces of the ball nut and into the ball groove of the inner surface;
   a stop pin disposed in the recess so that a portion of the stop pin extends inwardly into the ball groove of the inner surface of the ball nut; and
   a spring having a first end and a second end, the first end of the spring abutting the stop pin,
   wherein a portion of the ball screw shaft is rotatably received within the central bore of the ball nut, and the stop pin is formed by a coiled strip of metal having a first end, a second end, and an outer surface,
   wherein the first end of the spring abuts both the first end of the stop pin and the outer surface of the stop pin.

2. A ball screw assembly of claim 1, further comprising a roller ball, wherein the second end of the spring abuts the roller ball.

3. The ball screw assembly of claim 1, wherein the first end of the coiled strip of metal is disposed radially-outwardly of the second end of the coiled strip.

4. The ball screw assembly of claim 3, wherein the coiled strip of metal further comprises a pair of side edges extending between the first end and the second end, and each side edge is chamfered.

5. The ball screw assembly of claim 1, wherein the outer surface of the strip of metal is substantially cylindrical.

6. The ball screw assembly of claim 1, wherein the recess defines a circular segment in a plane transverse to an axis of the central bore of the ball screw nut such that an arcuate portion of the outer surface of the coiled strip is radially inward of the recess.

7. A ball screw assembly comprising:
   a ball screw shaft including a first ball groove formed in an outer surface thereof;
   a ball nut including a central bore formed by an inner surface thereof, the inner surface defining a second ball groove, the first ball groove being disposed inwardly of the second ball groove so that a ball raceway is formed therebetween, and a recess extending inwardly into the ball raceway;
   a stop pin disposed in the recess so that a portion of the stop pin extends into the ball raceway, the stop pin being formed by a coiled strip of metal having a first end, a second end, and an outer surface; and
   a spring having a first end and a second end, the spring being disposed in the ball raceway, and the stop pin extending transverse to the first end of the spring such that the first end of the spring abuts both the first end of the stop pin and the outer surface of the stop pin.

8. A ball screw assembly of claim 7, further comprising a roller ball disposed within the ball raceway, wherein the second end of the spring abuts the roller ball.

9. The ball screw assembly of claim 7, wherein the first end of the coiled strip of metal is disposed radially-outwardly of the second end of the coiled strip.

10. The ball screw assembly of claim 9, wherein the coiled strip of metal further comprises a pair of side edges extending between the first end and the second end, and each side edge is chamfered.

11. The ball screw assembly of claim 7, wherein the outer surface of the strip of metal is substantially cylindrical.

\* \* \* \* \*

UNITED STATES PATENT AND TRADEMARK OFFICE
CERTIFICATE OF CORRECTION

| | | |
|---|---|---|
| PATENT NO. | : 12,247,648 B2 | Page 1 of 1 |
| APPLICATION NO. | : 17/796825 | |
| DATED | : March 11, 2025 | |
| INVENTOR(S) | : Justin K. Brubaker et al. | |

It is certified that error appears in the above-identified patent and that said Letters Patent is hereby corrected as shown below:

In the Specification

In Column 4, Line 65, delete "other outer" and insert --outer--

Signed and Sealed this
Twenty-second Day of July, 2025

Coke Morgan Stewart
*Acting Director of the United States Patent and Trademark Office*